(12) United States Patent
Davies

(10) Patent No.: US 9,352,834 B2
(45) Date of Patent: *May 31, 2016

(54) MICRO UNMANNED AERIAL VEHICLE AND METHOD OF CONTROL THEREFOR

(71) Applicant: BCB INTERNATIONAL LTD., South Glamorgan (GB)

(72) Inventor: Barry Davies, South Glamorgan (GB)

(73) Assignee: BCB International LTD., South Glamorgan (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,467

(22) Filed: Jun. 12, 2015

(65) Prior Publication Data

US 2015/0314870 A1 Nov. 5, 2015

Related U.S. Application Data

(63) Continuation of application No. 14/310,307, filed on Jun. 20, 2014, which is a continuation of application No. PCT/GB2013/052745, filed on Oct. 22, 2013.

(30) Foreign Application Priority Data

Oct. 22, 2012 (GB) .................................. 1218963.5

(51) Int. Cl.
*G05D 1/10* (2006.01)
*G01S 15/93* (2006.01)
(Continued)

(52) U.S. Cl.
CPC .............. *B64C 39/024* (2013.01); *B64C 19/00* (2013.01); *B64C 39/028* (2013.01); *G01S 15/06* (2013.01);
(Continued)

(58) Field of Classification Search
CPC .. B64C 19/00; B64C 39/028; B64C 2201/00; B64C 2201/14; B64C 2201/141; B64C 2230/00; B64C 2230/02; G01S 15/06; G01S 15/88; G01S 15/89; G01S 15/8913; G01S 15/8929; G01S 15/8993; G01S 15/93; G05D 1/0202; G05D 1/102; G05D 1/101; Y10S 367/909

USPC ........ 701/3, 4, 300, 301; 367/87, 95, 96, 909; 342/29; 180/167; 181/125
See application file for complete search history.

(56) References Cited

U.S. PATENT DOCUMENTS 3,617,995 A 11/1971 Goulet
4,654,835 A 3/1987 Feintuch
(Continued)

FOREIGN PATENT DOCUMENTS

CN 201727964 2/2011
EP 2144038 1/2010
(Continued)

OTHER PUBLICATIONS

Search Report for Application No. GB1218963.5, dated Mar. 23, 2013.
(Continued)

*Primary Examiner* — Russell Frejd
(74) *Attorney, Agent, or Firm* — Workman Nydegger

(57) ABSTRACT

A micro unmanned aerial vehicle or drone ("UAV") 10 is remotely controlled through an HMI, although this remote control is supplemented by and selectively suppressed by an on-board controller. The controller operates to control the generation of a sonar bubble that generally encapsulates the UAV. The sonar bubble, which may be ultrasonic in nature, is produced by a multiplicity of sonar lobes generated by specific sonar emitters associated with each axis of movement for the UAV. The emitters produce individual and beamformed sonar lobes that partially overlap to provide stereo or bioptic data in the form of individual echo responses detected by axis-specific sonar detectors. In this way, the on-board controller is able to interpret and then generate 3-D spatial imaging of the physical environment in which the UAV is currently moving or positioned. The controller is therefore able to plot relative and absolute movement of the UAV through the 3-D space by recording measurements from on-board gyroscopes, magnetometers and accelerometers. Data from the sonar bubble can therefore both proactively prevent collisions with objects by imposing a corrective instruction to rotors and other flight control system and can also assess and compensate for sensor drift.

10 Claims, 3 Drawing Sheets

(51) Int. Cl.
*B64C 39/02* (2006.01)
*G05D 1/00* (2006.01)
*B64C 19/00* (2006.01)
*G01S 15/06* (2006.01)
*G01S 15/88* (2006.01)
*G01S 15/89* (2006.01)
*G05D 1/02* (2006.01)

(52) U.S. Cl.
CPC ............... *G01S 15/88* (2013.01); *G01S 15/89* (2013.01); *G01S 15/8913* (2013.01); *G01S 15/8929* (2013.01); *G01S 15/8993* (2013.01); *G01S 15/93* (2013.01); *G05D 1/0088* (2013.01); *G05D 1/0202* (2013.01); *G05D 1/101* (2013.01); *G05D 1/102* (2013.01); *B64C 2201/00* (2013.01); *B64C 2201/14* (2013.01); *B64C 2201/141* (2013.01); *B64C 2230/00* (2013.01); *B64C 2230/02* (2013.01); *Y10S 367/909* (2013.01)

(56) References Cited

U.S. PATENT DOCUMENTS

| | | |
|---|---|---|
| 4,951,268 A | 8/1990 | Grall |
| 5,101,383 A | 3/1992 | Doisy et al. |
| 5,142,505 A | 8/1992 | Peynaud |
| 6,215,730 B1 | 4/2001 | Pinto |
| 6,804,607 B1 | 10/2004 | Wood |
| 7,929,375 B2 | 4/2011 | Nuttall et al. |
| 2007/0093945 A1 | 4/2007 | Grzywna et al. |
| 2015/0160658 A1 | 6/2015 | Reedman et al. |

FOREIGN PATENT DOCUMENTS

| | | |
|---|---|---|
| WO | 2006138387 | 12/2006 |
| WO | 2010137596 | 12/2010 |
| WO | 2014064431 | 5/2014 |

OTHER PUBLICATIONS

U.S. Appl. No. 14/310,307, Mar. 13, 2015, Notice of Allowance.
International Search Report for PCT/GB2013/052745 dated May 20, 2014.

MICRO UNMANNED AERIAL VEHICLE AND METHOD OF CONTROL THEREFOR

CROSS-REFERENCE TO RELATED APPLICATIONS

This application claims priority to and is a continuation of U.S. patent application Ser. No. 14/310,307, filed Jun. 20, 2014, entitled "MICRO UNMANNED AERIAL VEHICLE AND METHOD OF CONTROL THEREFOR", which application claims priority to, and the benefit of, PCT Application Serial No. PCT/GB2013/052745, filed on Oct. 22, 2013, entitled "MICRO UNMANNED AERIAL VEHICLE AND METHOD OF CONTROL THEREFOR", which also claims priority to and the benefit of Great Britain Patent Application No. 1218963.5, entitled "MICRO UNMANNED AERIAL VEHICLE AND METHOD OF CONTROL THEREFOR", filed on Oct. 22, 2012. All of the aforementioned applications are incorporated by reference herein in their entirety.

BACKGROUND TO THE INVENTION

The present invention relates, in general, to a unmanned aerial vehicle (UAV) and is particularly, but not exclusively, applicable to a flight control system for a micro or nano UAV that is tasked with reconnaissance and covert data gathering for risk assessment. More particularly, the present invention relates to control of a UAV using a locally generated sonar bubble.

SUMMARY OF THE PRIOR ART

In the design of military or surveillance UAV systems, it is necessary for the flight-control system to be responsive, robust and lightweight. Particularly, the agile manoeuvring of a UAV relies upon accurate operational regulation of its individual motors that collectively control 3-dimensional movement of the UAV device in space and real time. Indeed, fine manoeuvring control is required to permit secure and safe reconnoitre into buildings, with current line-of-sight systems entirely failing to mitigate anything that is not seen by the remote handler or which is only seen at a point that is too late to calculate a new flight path given current flight control settings, such as speed or altitude. In fact, even a camera-based UAV system, transmission path delay or multi-path interference experienced in radio frequency (RF) operation may present sufficient delay to jeopardize or compromise the remote UAV drone. Indeed, current line-of-sight systems require direct active control.

Micro UAV technology is particularly interesting from the perspective of inspection and reconnaissance since the small size unit can be manoeuvred, under remote control, into small or dangerous areas to determine and relay images of a threat or risk. The drone footprint for a micro UAV is usually in the region of a meter in size and often significantly smaller, with a weight in the range of less than a few hundred grams. This small size places considerable constraints on payload and motor size, with the motor technology relying on battery cells (such as lithium ion technology) for power.

It has been known to make use of inertial navigation or inertial guidance systems in UAV technologies, but principally only in larger scale devices rather than micro UAV implementations. These inertial systems support navigation/guidance through the use of a computer, motion sensors (i.e. accelerometers that measure linear acceleration) and rotation sensors (i.e. gyroscopes that determine pitch, roll and yaw to support calculation of angular velocity) and magnetometers that operate continuously to determine and the to calculate, via dead reckoning approach, the position, orientation and vector (i.e. speed and movement direction) of a moving object in the reference frame. More particularly, by tracking both the current angular velocity of the system and the current linear acceleration of the system measured relative to the moving system, it is possible to determine the linear acceleration of the system in the inertial reference frame. As will be understood, performing a suitable integration on the inertial accelerations yields the inertial velocities and inertia position of the system.

Once established against an initial reference condition at a reference point, an inertial navigation therefore does not reference external sources and is immune to jamming. Inertia navigation systems are, however, relatively expensive and are nevertheless susceptible to drift error. With the passage of time, small errors in the measurement of acceleration and angular velocity are integrated into progressively larger errors in velocity, which are compounded into still greater errors in position. Since the new position is calculated from the previous calculated position and the measured acceleration and angular velocity, these errors accumulate roughly proportionally to the time since the initial position was input. In fact, drift can attributed to two processes: i) an offset from zero arising when there's no movement; and ii) a sensor resolution that is insufficient to detect small movements, these errors accumulate over time and result in an error in the calculated position. Moreover, in the context of drift in sensors associated with maintaining level flight or controlling roll or yaw rates, continuous and unchecked drift can potentially critically compromise flight stability to the extent that the drone eventually crashes.

As such, the drift in inertial navigation is a real problem, although increasingly more sophisticated and larger multi-axis sensors with very high resolution can reduce (but not eliminate) the percentage drift error.

It is therefore necessary for the position in an inertia navigation system to be periodically corrected by input from some other type of navigation system, such as GPS. However, GPS isn't necessarily always available and, in any event, is likely to provide only an approximate location in the confines of a room in a building where there's no line-of-sight and/or where signal attenuating effects can compromise accurate position determination.

Clearly, large scale corrective systems do not fit well with the restriction imposed on weight, available power and the covert nature of micro or nano UAV drones.

Laser-based distance measuring systems, while extremely accurate, provide only a highly-directional beam. In any event, laser-based systems are relatively heavy and therefore generally incompatible with the load constraints and energy resources associated with micro and nano UAV drones.

CN201727964U describes a toy helicopter with a collision prevention system realised by six ultrasonic sensors installed on the top, at the bottom, in the front, in the rear and on the left and right sides of the toy.

WO 2006/138387 relates to a system and method to detect an impending contact or collision between a subject vehicle, which may be an aircraft, a watercraft or a load-handling vehicle, and stationary objects or other vehicles in the vicinity of the subject vehicle. The system comprises distance or motion-detecting sensors mounted at positions on the subject vehicle at risk of such collision or contact, and alerting means, responsive to said sensors, to notify the operator of the subject vehicle and/or the operators of such other vehicles in the vicinity of the subject vehicle of the risk of a collision. Preferred embodiments comprise alerting means which indicate to the operator of the subject vehicle which, if any, sensors detect an object closer to the subject vehicle than a predetermined distance of safe approach.

U.S. Pat. No. 6,804,607 describes a collision avoidance system for an aircraft or other vehicle that monitors a sphere or other safety zone/cocoon about the vehicle. A light-detecting camera or other sensor receives a signal return if any object enters the safety cocoon. Once an object is detected in the cocoon, a signal is sent to the onboard sense and avoid computer and corrective action is taken. The system is capable of autonomous operation, and is self-contained and does not require additional hardware installations on target vehicles. The size and shape of the safety cocoon monitored by the sensors adjusts according to the speed and motion vectors of the aircraft or other vehicle, so as to maximize efficient use of sensor capabilities and minimize the size, cost and power requirements of the system.

WO 2010/137596 describes is a mobile body control device for detecting an object or the like present around the mobile body and detecting the distance to the object and the outline of the object in order that the mobile body can avoid an obstacle and can land on a flat location without using any GPS device. The mobile body control device is mounted to a mobile body and used. The mobile body control device comprises an ultrasonic sensor unit for measuring the distance to a peripheral object in the vicinity thereof using an ultrasonic wave having a weak directivity and outputting vicinity information which is the result of the measurement and an infrared sensor unit for repetitively transmitting infrared radiation from the infrared sensor by vibration into a prescribed scope viewed from the mobile body, determining the outline of an object within the prescribed scope, measuring the distance to the outline, and outputting outline information which is the result of the measurement.

SUMMARY OF THE INVENTION

According to a first aspect of the present invention there is provided a UAV containing a drive system for propelling the UAV through a spatial environment: a controller for controlling the drive system and overseeing operation of the UAV; a multiplicity of sonar emitters associated with different axes of travel of the UAV, each sonar emitter producing a sonar lobe extending outwardly in a specified direction along each of said different axes of travel, the sonar lobes combining to encapsulate the UAV in a sonar bubble; and a multiplicity of sonar detectors, each axis of travel associated with a plurality of sonar detectors, wherein the sonar detectors are coupled to the controller to permit the controller, in response to echoes reflected off objects within the sonar bubble, to interpret and then generate a 3 D image of the spatial environment in which the UAV is stationary or moving and within which spatial environment the objects are stationary or moving; and wherein the controller is configured or arranged automatically to moderate the drive system in response to an assessed position of objects in the 3-D image relative to the UAV such that the controller independently controls movement of the UAV through the spatial environment along each axes of travel.

In a preferred embodiment the sonar bubble is assembled from partially overlapping three-dimensional spatial sonar lobes generated by relatively inclined pairs of sonar emitters.

Preferably, at least two sonar detectors are associated with each direction long each axis of travel, and wherein the controller is configured or arranged to resolve detected variations at least one of signal strength and round trip timing for pings to and echoes from objects in the sonar bubble to assess a relative position and nature of those objects with respect to the UAV.

The UAV may further comprise: motion and position sensors configured to measure absolute movements of the UAV in 3-D space; and a memory for storing the absolute movement of the UAV in the spatial environment as resolved by the controller having regard to the measure of absolute movements and the 3-D image constructed from object data acquired from use of the sonar bubble.

Object data acquired from use of the sonar bubble can be used to compensate for drift in at least one of the motion and position sensors.

In a second aspect of the invention there is provided a method of controlling movement of a UAV through 3-D space, the method comprising: generating a sonar bubble that substantially encapsulates the UAV, the sonar bubble assembled from overlapping beamformed sonar lobes produced from sonar pings emanating from a multiplicity of sonar emitters on the UAV, the sonar emitters associated with directions of movement of the UAV through the 3-D space; in response to echoes reflected off objects within the sonar bubble following production of said beamformed sonar lobes and as detected by a multiplicity of sonar detectors on the UAV, having a controller in the UAV interpret and then generate a 3-D image of the spatial environment in which the UAV is stationary or moving and within which spatial environment the objects are classified as stationary or moving; and having the controller independently and automatically control movement of the UAV through the spatial environment by applying direct control to a drive system tasked with effecting movement in each axis of travel.

Preferably, the method of further comprises: measuring absolute movements of the UAV in 3-D space using motion and position sensors; storing in memory the absolute movement of the UAV in the spatial environment as resolved by the controller having regard to the measure of absolute movements and the 3-D image constructed from object data acquired from use of the sonar bubble; and under automatic instruction from the controller and with reference to the memory, automatically re-tracing the movement of the UAV upon loss of an external control signal or upon receipt of an instruction received over a wireless link.

In some embodiments the method can include: establishing a hover mode in the UAV; and based on distance measurement data to objects acquired from use of the sonar bubble, compensating for drift in at least one motion or position sensor in the UAV.

Accordingly, in a preferred embodiment, a micro unmanned aerial vehicle or drone is remotely controlled through an HMI, although this remote control is supplemented by and selectively suppressed by an on-board controller. The controller operates to control the generation of a sonar bubble that generally encapsulates the UAV. The sonar bubble, which may be ultrasonic in nature, is produced by a multiplicity of sonar lobes generated by specific sonar emitters associated with each axis of movement for the UAV. The emitters produce individual and beamformed sonar lobes that partially overlap to provide stereo or bioptic data in the form of individual echo responses detected by axis-specific sonar detectors. In this way, the on-board controller is able to interpret and then generate 3-D spatial imaging of the physical environment in which the UAV is currently moving or positioned. The controller is therefore able to plot relative and absolute movement of the UAV through the 3-D space by recording measurements from on-board gyroscopes, magnetometers and accelerometers. Data from the sonar bubble can therefore both proactively prevent collisions with objects by imposing a corrective instruction to rotors and other flight control system and can also assess and compensate for sensor drift.

Advantageously, the present invention provides a UAV system having a high degree of self-awareness that supports a highly stable flight-control system capable of providing an effective collision avoidance system. The UAV is therefore ideal for covert intelligence gathering and stealthy incursion, with the system controlled from a remote and thus generally safe location. In fact, the system of the present invention is sufficiently advanced so that it compensate for temporary loss of direct RF control, since the system can be set up to be self-regulating and is self-aware of its local environment. The preferred embodiment provides for a drone-based system that can plot the movement of the drone in 3-dimensional (3D) space and record all relative movements to fractions of a degree and millimeter precision.

Beneficially, the present invention provides environmental awareness for a UAV system that can be used autonomously to counter drift and furthermore provide enhanced (remote) control which benefits from a local, on-board decision-making system that functions to avoid collisions and/or UAV instability.

Furthermore, in being able to store a record (during ingress, for example, into a building and reflecting sonar-recovered data and monitored changes in gyroscopic, course heading and accelerometer measurements) of relative movement of the UAV, reversal of record of those recorded movements permits the UAV's controller to execute a rapid and controlled automatic egress of the UAV from the building.

Beneficially, inertial guidance is furthermore improved by use of the sonar bubble in the UAV of the preferred embodiment. Particularly, in a hover state, detected changes in echo path bouncing off an object and recovered at one or more sonar detectors implies a level of drift that can be identified, locked out and compensated by an internal controller of the UAV; this means that on-board sensors in the UAV can be locally calibrated by the local controller procedure. If the level of movement detected by a sensor is greater than self-determined levels of drift associated with that sensor, then the UAV's controller can resolve that the object is moveable and thus not part of the fixed environment. In building an accurate and current environmental map based on recorded sonar echos, the controller is therefore able to exclude obstacles that move with time.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

As a way of compensating for drift in motor control and general drift in the UAV arising from variation is air pressure and/or local currents or thermal effects, one might consider the use of collision bars or push rods (collectively "bumpers") that strategically extend outwardly from the body of a UAV. In this way, the bumpers contact an obstacle and therefore mitigate the temporary loss of control. However, this approach is considered to be compromising and generally ineffectual given that range and usefulness of the UAV are dependent upon overall weight and unobtrusiveness. In this respect, the bumpers add to the overall weight (thus limiting the payload capabilities of the UAV) and increase the overall size of the UAV, thereby increasing the size of the UAV and potentially decreasing aerodynamics and the ability to control flight of the UAV. In fact, the use of bumpers, while logical, is fundamentally at odds with the functional requirement for a UAV since the bumpers serve no purpose in collecting information, supporting payload (such as a video camera) or improving manoeuvrability and overall responsiveness of the drone.

Turning to a preferred solution to the problem, the inventors have recognized that the formation of an ultra-sonic "bubble" or envelope around the UAV provides significant technical control advantages without significantly increasing overall UAV weight or component costs. This bubble is assembled from partially overlapping three-dimensional spatial lobes generated and detected by relatively inclined pairs of emitters/detectors positioned on each relevant surface. The system, which is preferably an active system, emits and ping and then looks to detect an echo. In offsetting the nominal major axis for each spatial lobe, a hysteresis effect and/or an absolute but relative signal strength in reflected signal strengths/timing can be used to refine more accurately the location of an obstructing object or structure. In essence, each pair of sensors contributes diverging but bioptic (or stereo or 3D) data reflection components that permit a processor to interpret and then generate (or otherwise assess) 3-D spatial imaging of the physical environment in which the UAV is currently active/positioned. The bubble may be formed using ultrasonic techniques or lower frequency sonar techniques, as will be readily understood. The term "sonar" will be used as a generalized form to cover and refer to each spatial lobe and the overall bubble produced by the emitters/detectors.

The bubble or envelope extends from at least each of the side surfaces (i.e. front, back, left and right) of the UAV and, preferably, also from top and bottom surfaces to provide an encapsulating sphere having the UAV centrally located therein. Each sonar bubble is assembled from a narrow beam or multiple narrow beans that undergo a degree of beamforming to produce a suitably shaped spatial sonar bubble; these lobes are essentially balloon shaped.

Figure 1:
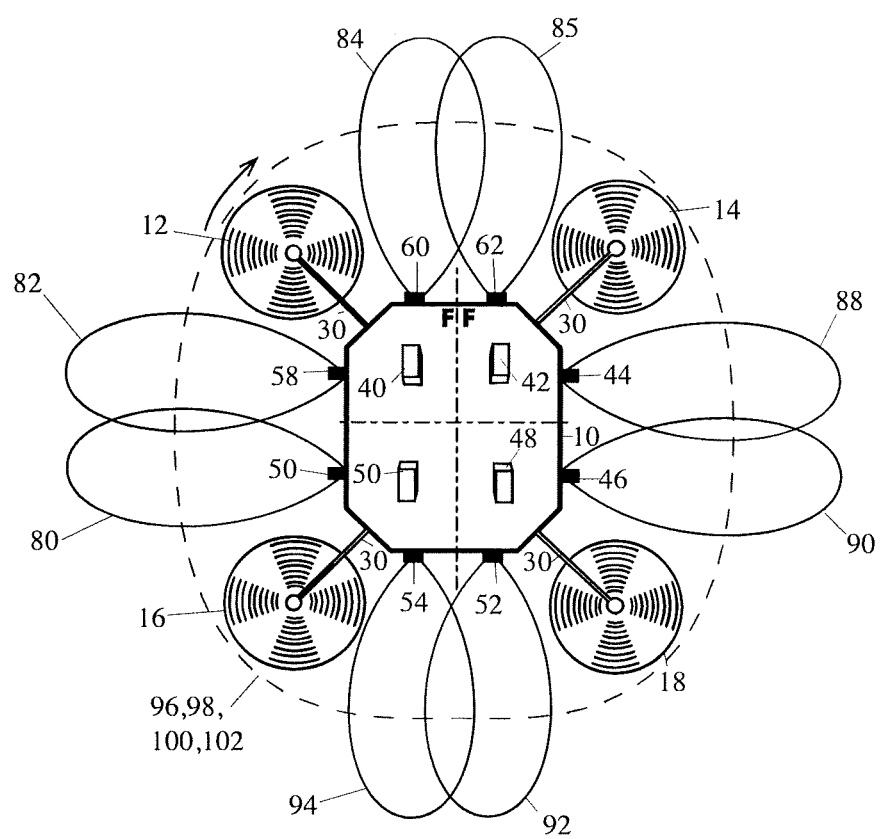
FIG. 1 is a plan view and schematic representation of a micro UAV according to a preferred embodiment of the present invention.

FIG. 1 and that show plan and side schematic representations of a micro UAV 10 according to a preferred embodiment of the present invention. In a preferred embodiment, the UAV 10 is configured in a quadrocopter or four-rotor cross arrangement. Control of UAV motion is achieved by altering the pitch and/or rotation rate of one or more rotor discs 12-20, thereby changing its torque load and thrust/lift characteristics. Other configurations made be used, but counter-rotating pairs of front rotors and rear rotors positioned diagonally outwardly from corners of a fuselage 22 of the drone and fore and aft (and either side) of a centre point 24 of the UAV. Although not shown as an optimized aerodynamic design, the plan view of the micro UAV shows four individual drive shaft housings 30 configured in an X-orientation with respect to a fuselage 22, with each drive shaft housing (containing a drive shaft and associated servo controllers) coupled to a generally horizontally-orientated rotor.

To emphasise the relative position of the drive shafts and spatial sonar lobes and overall sonar bubble, the fuselage 32 is illustrated having a plan view that is octagonal in shape. The front (F) of the fuselage is marked in the drawing. Of course, many other fuselage configurations are possible, although aerodynamic consideration and the presence of stealth techniques with reflecting planar surfaces will be design consideration understood and applied by the skilled addressee. The diagram does not extend the lobes about the rotors, but this is solely to avoid the diagram from becoming overly cluttered. In practice, the lobes will extend around and beyond the rotor end points, with the controller sensitized to exclude very near-field echo associated with the rotors.

Figure 2:
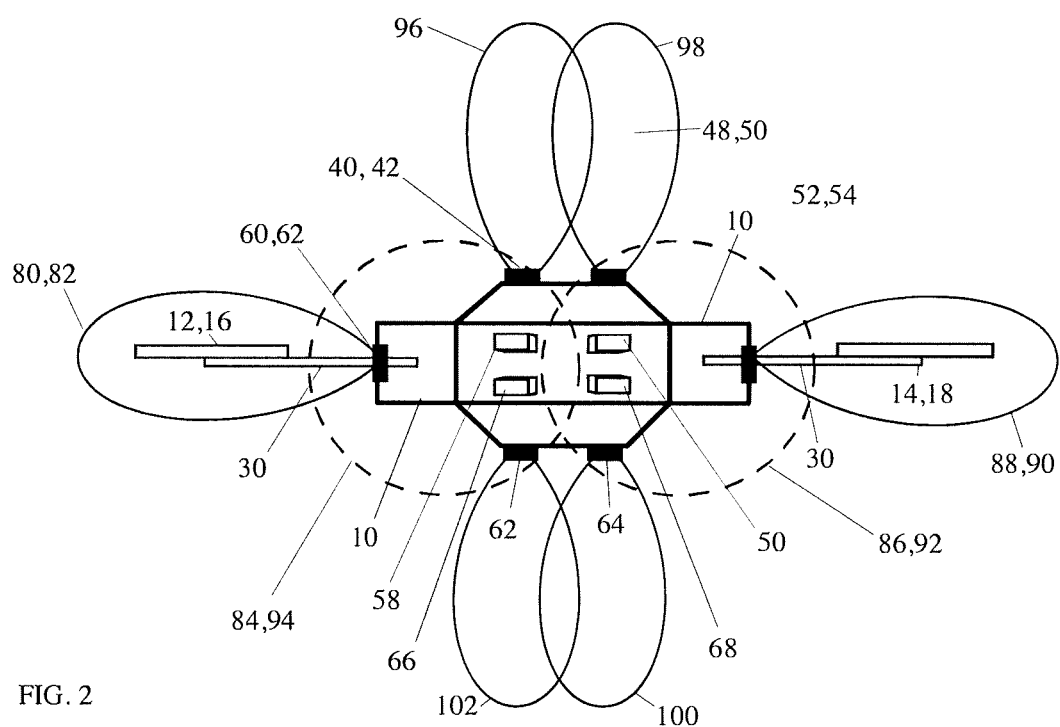
FIG. 2 is a side view of the micro UAV of FIG. 1.

To address the issues of drift and/or inertial and non-available GPS navigation, relative positioning and relative hold abilities of the UAV, FIGS. 1 and 2 further show the use of sonar emitters and detectors 40-68, with these placed on the principle outward surfaces (i.e. front, rear, left, right, upper and lower surfaces) of the fuselage to provide sonar coverage with respect to each major axis of motion. Consequently, pairs of deflectors produce overlapping lobes for each major surface and, in totality, a generally spherical envelope that has, at its centre, the UAV 10. In FIGS. 1 and 2, sonar lobes 80-94 extend outwardly from side surface, whereas sonar lobes 96, 98 project upwardly and sonar lobes 100, 102 project downwardly relative to the fuselage 22. Together, sonar lobes 80-102 produce the encapsulating sonar bubble that generally completely encases the fuselage and rotors, but may also include some blind spots.

Each emitter is controlled to produce a "ping" that produces a relatively narrow beam-shaped 3D spatial sonar lobe extending outwardly of the fuselage 22 by approximately 2.00 meters (m) to 5.00 m. The width of each sonar lobe is in the approximate region of about 150 millimeters (mm) to about 400 mm. The shape of the sonar lobes is tailored so as not to infer/impinge with the rotor positions, but generally to produce an effective protection envelope that is sufficiently large so as to detect obstruction at a point in time and space that is earlier enough to permit local evasive action to be computed and executed (based on sonar imaging of the environment). For example, the reach of each sonar lobe is sufficient to compensate for typical in-building flight speeds (of a few meters per second) and retarding actions applied to the rotors through rotor control by an on-board local controller. Beamforming and limited dispersion of each sonar lobe from its directional pulse therefore effectively compensate for the omission of coverage at the rotors. Of course, it envisaged that a one or more sonar detectors could be positioned at the end of each drive shaft housing 30 to provide specific imaging capabilities extending on a line outwardly of the each rotor, with this merely a design option that requires appropriate signal processing to provide sonar image. To avoid false positives on echoes triggered by rotor operation and rotor position, a preferred embodiment of the sonar system of the various preferred embodiments operates with a hold-time that ignores any echo that are too close to the drone to be useful, i.e. a retuned echo is less than a predetermined period of time from the initial ping. In the space domain, this means that if the tips of the rotors, say, 150 mm from the emitters, any bounced echoes considered to be closer that 150 mm is ignored.

Figure 3:
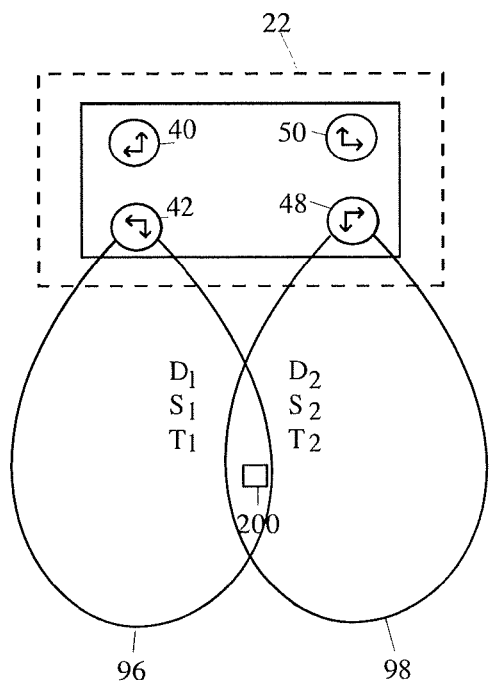
FIG. 3 is shows a surface of the micro UAV of FIG. 1, the surface including inclined pairs of ultra-sonic emitters/detectors.

Turning to FIG. 3, a surface (such as an upper or side surface) of the UAV fuselage is shown to include inclined pairs 40, 42, 48, 50 of sonar emitters/detectors. In this respect, the sonar emitter/detector pairs 40, 42, 48, 50 are represented by circles with arrows that show the general relative directional coverage area provided for each lobe with respect to an adjacent lobe. With some dispersion and overlap of the sonar lobes, a bioptic effect is produced from which an understanding of relative position and/or drift can be calculation. The assessment can be based on a triangulation calculation that uses a round trip timing for the ping-echo and/or measured signal strength/quality in the echo. Signal strength/quality can therefore be used to compensate for interference, although the short range and generally line of sight operation of the sonar means that multipath is seldom a problem. By way of example, an object 200 (such as a pillar or door frame) in the field of detection of sonar lobes 96, 98 may be at distance $D_1$ from a first emitter/detector 42 and distance $D_2$ from a second emitter/detector 48, where $D_1 > D_2$. Consequently, the received signal strength from an echo received at the first emitter/detector 42 and the second emitter/detector 48 would be at a level $S_1$ and $S_2$, respectively, where $S_1 < S_2$. The elapsed time between sending the ping and receiving the echo for the first emitter/detector 42 and the second emitter/detector 48 would be time $T_1$ and time $T_2$, respectively, with $T_1 > T_2$. In other situations, an object may simply only appear within one sonar lobe, with this being sufficient to identify a potential obstruction and its general location relative to the UAV 10. Given an assessment of the environment, remote control and/or drift can be compensated at local UAV level, i.e. on a near instantaneous basis the controller 302 of the UAV can suppress or correct movement in any one or multiple planes based on the sensed relative position of objects/obstructions within the sonar bubble. This control is available irrespective of whether there is line-of-sight to the UAV or whether the UAV has access to external GPS data or any referenced map or plan that potentially defines a predetermined flight path.

In operation, simultaneous sonar pulses ("pings") are sent from every emitter on every axis on the UAV 10. Detectors on each surface (which detectors are typically be collocated with their emitters) wait for, i.e. detect, echo responses (often many per sensor) and use this information to build up an environment around the UAV 10. This process is not dissimilar to basic ultrasonic range finding used in car bumper/fender systems. The sonar bubble therefore tracks relative position of objects over time during active flight.

From a resolution perspective, the preferred embodiment makes use of high resolution timing circuits to calculate time between ping transmission and echo reception/detection. Similarly, the filters in the circuit are matched to support high resolution. It has been appreciated that one can operate the system to average the sonar results to get a stable result (like car sensors do), but this removes accurate timings and also introduces a phase lag. Indeed, as sonar bounces off objects it can produce constructive and destructive interference and "beating". To get around this, the various sonar forms have been characterised that the filter designed accordingly. From a functional perspective, the filter has a very small phase lag, operates to detect the direction of objects in the sonar path (e.g. through detected signal strength) and removes noise and beating from the responses to give multiple stable echoes and therefore an indication of direction of each object heading towards or away from the sensor set. In following this functional regime, better than mm resolution can be obtained with respect to timing and, post-processing, mm resolution in movement and location is achieved.

Since a sonar ping on a fixed object at a fixed distance can varying slightly due to interference and path, these false positive can suggest actual movements. Consequently, a preferred embodiment takes a number of samples for each echo to determine if there is relative and continuing movement in a certain direction or whether the detected echo is just associated with jittering. By making this determination, the system removes the jitter or noise and just reacts to actual movement on all echoes.

The circuits therefore provide millimeter resolution and accuracy from every sonar sensor. Preferably, the system further calibrates for air temperature. As will be appreciated, air temperature changes the speed at which sound travels, with this change bringing about slight differences in sonar response. Measurement of temperature may therefore be used in conjunction with a look-up table to adjust for temperature and/or humidity changes. Other correction techniques, readily appreciated by the skilled address, may be employed.

Figure 4:
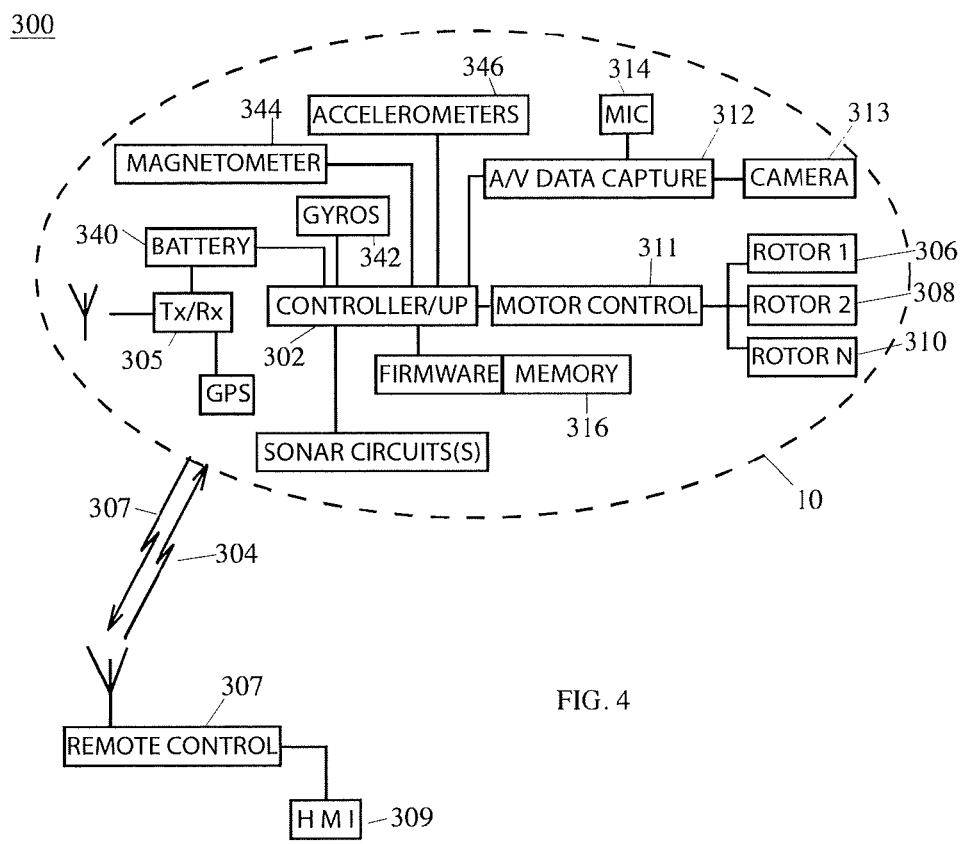
FIG. 4 is a schematic representation of a UAV reconnaissance system including a schematic representation of the micro UAV of FIG. 1.

FIG. 4 is a schematic representation of a UAV reconnaissance system 300 including a schematic representation of the micro UAV 10 of FIG. 1

The UAV 10 is based around a control system 302 that is processor based and which control system processes sonar data and remotely generated instructions 304 to effect control of UAV hardware and UAV reconnaissance functionality. A transceiver 305 (but at least a receiver) allows for RF communication to a remote control centre 307. For example, downlink communication to the UAV can provide flight control instructions, whereas an uplink 307 may support coded transmission of telemetry data gathered from the UAV and detailing operation and/or streamed video and/or audio files.

The controller 302 of the UAV is coupled to a motor controller 311 responsible for servo control of ailerons and the like. The motor controller 311 is further coupled to rotors 306-310 for individual control thereof.

AV data equipment 312 for controlling and generally overseeing the capture of video and/or still image data (including images in the visible and/or infrared wavelengths) from a suitable camera 313 and/or audio from a microphone 314. The camera 313 therefore allows for non-line-of-sight operation.

The control system is, ultimately, down to design and may make use of multiple processors that are task-optimised.

The UAV 10 further includes memory 316, coupled to the controller 302, containing firmware and software and, optionally, RAM storage for accumulating data acquired by the UAV in a reconnaissance role. If data is captured and stored, then real-time streaming may be limited.

As will be understood, the UAV 10 also includes a power supply 340, such as a lithium rechargeable battery, providing power to the transceiver 305, controller 302 and other components. Measured telemetry data is provided to the controller 305 from one or more gyroscopes 342, one or more magnetometers 344 and multiple accelerometers 346 that cooperate with the firmware to assess local inertia movement in the UAV's various degrees of movement and thereby support navigation and identify position/orientation. The operation and configuration of these measurement devices are well known, as is how they interact with a microprocessor-based control system to provide real-time flight control. The accelerometers are typically configured to be low noise units that apply filtering and compensation algorithms to remove noise and The controller 302 is coupled to the sonar emitters/detectors to control pings and process recovered echos from multiple detectors. As previously explained the sonar system is extensive and associated with the numerous planes of movement of the UAV 10.

The UAV may further include a GPS system 350 that makes use of satellite position.

In terms of remote control, the remote control centre 307 will include some form of human machine interface (HMI) 309 that includes a display allowing visual presentation of video data observed by the camera and a control interface (such as a joystick, pedals and a keyboard) that allow remote flying (or driving in the case of a wheel or track-based drone) of the UAV 10.

Advantageously, if the UAV 10 of the preferred embodiment is within a building, the sonar bubble is used to plot relative and actual movement of the UAV and the relative positions of objects. The plot of movement is therefore entirely independent of external GPS-based data, with the plot providing the UAV with an ability for independent control from learnt ingress into the building. More particularly, given that the controller receives a sonar picture of the environment and also gyroscopic, course heading information (from the magnetometer) and applied movement from the accelerometers, the controller 302 is configured to assemble a map and actual path of the UAV through the environment, e.g. rooms and floors in a building, which map and path are stored in memory 316. Consequently, independently of any remote control (but typically upon receipt of a downlink instruction 304 or upon absence of any direct control instruction for a predetermined period of time), the UAV references the memory and executes a rapid and automated egress from the building through the reversal of the recorded UAV's movements. The reversal of precisely recorded movement, in fact, means that a map of the building is not actually required given that the movement is relative to the obstacles and layout of the building and that the UAV's movement is strongly influenced by the sonar bubble. This means that the UAV 10 can be recovered either the location of the remote control centre 307 or to a point where RF contact with the remote control centre 307 is re-established. Of course, the sonar bubble is again used as a cross-check on egress to confirm that nothing fundamentally has changed in the plotted environment and to ensure that the UAV remains in free space (and therefore away from potential obstructions against which it could collide and be damaged). This extends the UAV's ability to operate in a GPS-deprived environment.

Turning to the situation of hover where the UAV is ideally stationary, the sonar bubble also acts to offset drift within servos and motor controls. It has been identified that the sensors tend to drift with variations in temperature and also at each start-up. Specifically, if the UAV is turned on and set to hover in a test environment containing fixed near field obstructions detectable within the various sonar lobes, any change in response in the sonar-detected environment along any movement axis indicates the presence of drift in the sensor or control circuits. For example, if an object is detected by front-, side- and bottom-facing sonar detectors, the controller 303 resolves the position of the object in 3-axis. With the controller configured to monitor actual movement to a high degree (and ideally mm accuracy), the controller can calculate drift in the inertial sensors of the UAV 10 based exactly on what the drift is and even without sonar lock. Consequently, by compensating for this sonar-measured drift and attaining substantially stationary hover, the UAV's controller 302 can self-calibrate and lock the UAV's on-board sensors and servos to eliminate completely this drift. The sonar bubble therefore supports attainment of in-flight stability and provides an effective multi-axis inertial navigation system. Indeed, there is no reason why re-calibration cannot be applied during a flight, provided that the UAV is set to a hover mode in an environment where wind turbulence is minimal, e.g. within a building. Consequently, sensor lock is improved and can be updated during use of the UAV and incursion for reconnaissance purposes.

Of course, throughout flight and ingress of the UAV, data from the camera (and optionally the microphone) are relayed back to the remote control 307 for review and UAV control purposes.

In terms of determining whether an object within the sonar bubble is active, e.g. the movement of a cat, the sonar-bubble of the present invention is also able to assist in resolving movement provided that the UAV is in a hover mode. Specifically, with the compensated drift in the inertial systems of the system of the preferred embodiment being in the region of a few millimeters per minute, so long as the movement of the object from which an echo is being received is less than that the sensor-locked compensated drift, the controller is programmed to interpret the object as being stationary and therefore to cancel the drift. If the movement from the detected echo is more than the drift in the inertial systems, the controller can reasonably conclude that the object is in fact moving. Therefore, in assembling the environmental map based on sonar tracking of objects, any object that is tagged as mobile can be disregarded to the extent that data relating to the object is positively excluded from the UAV's inertial navigation system.

From the perspective of using GPS data, the drone can (at least at the point of release) be assumed to be accurately mapped by the GPS system. However, with time and movement, GPS signal attenuation or satellite loss is a genuine concern. The sonar bubble and relative tracking/movement procedure described herein therefore permits an assessment on the reliability of the GPS. Specifically, by tracking relative movement of the UAV using the sonar bubble, an absolute position of the UAV is known locally to the controller relative to a nominal reference location (such as the point of power-up or point of entry into a building). If received GPS data does not tally with a net calculated position of the UAV derived from absolute relative movement of the UAV and relative to the reference location, then the GPS data is corrupted and can be considered unreliable. At this point, the local UAV controller 302 can disregard the GPS data or otherwise re-set its own known position within its GPS system based on the integration of data from its gyros, accelerometers, compass (magnetometer) and the sonar bubble. Inertial navigation data and inertial guidance is therefore improved.

Figure 5:
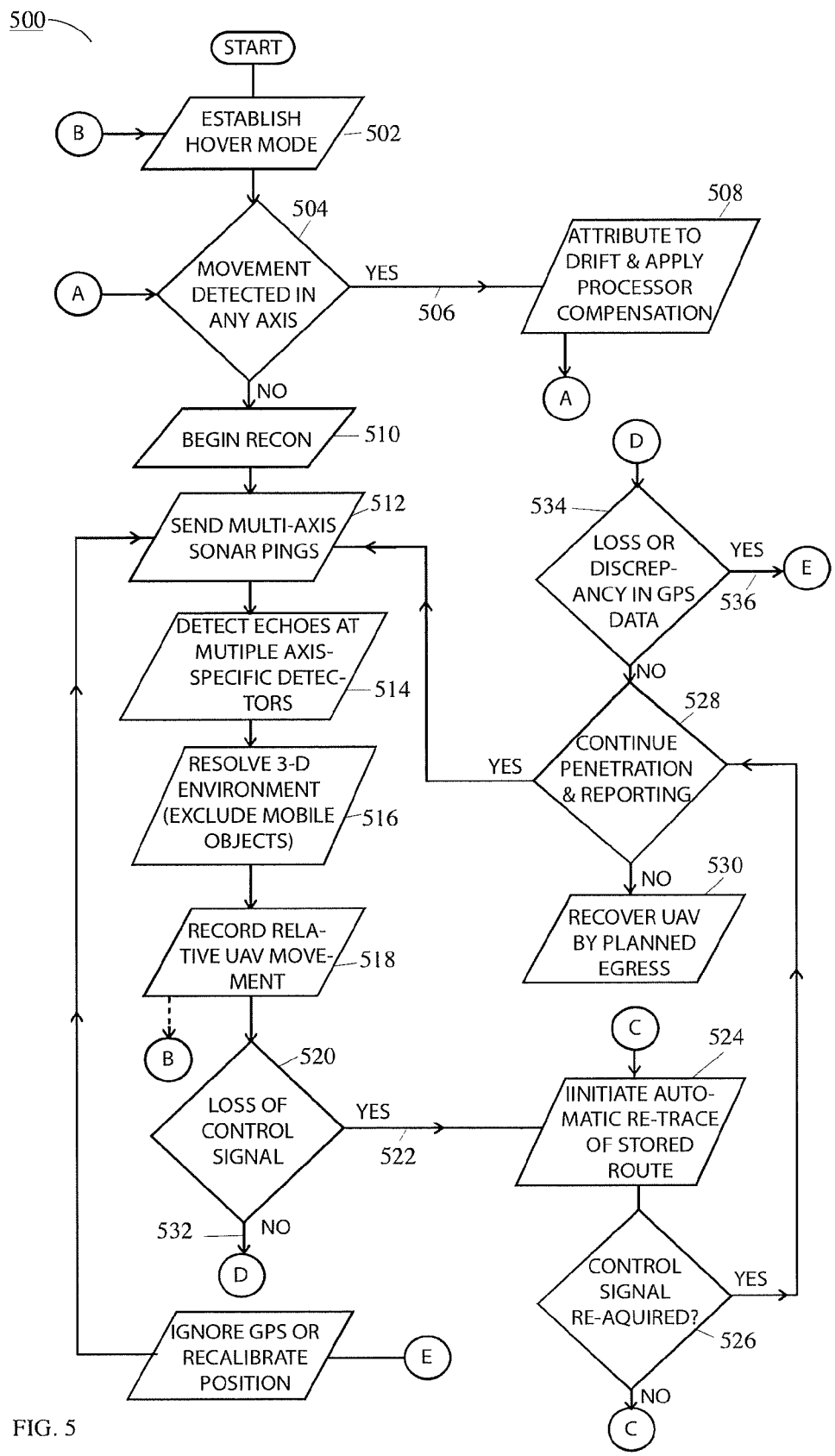
FIG. 5 is a flow diagram of a process of mapping and controlling egress of the UAV of FIG. 1 from a building or obstacle-cluttered environment.

FIG. 5 is a flow diagram 500 of a process of mapping and controlling egress of a UAV from a building or obstacle-cluttered environment.

After initiation of the UAV, the UAV 10 typically enters into and establishes a hover mode 502; this is a calibration. The internal controller 302 controls the sending of sonar pings and recovers echoes from the various emitters/detectors. The controller then resolves 504 whether movement has been detected in any access. In the affirmative 506, the movement is created to drift and the controller 302 applies appropriate compensation 508 to establish sensor lock. If there is no identified movement (as resolved by the controller 302), the UAV is considered to the stable and reconnaissance and building ingress can begin 510 under downlink instructions communicated by the remote control centre 307 (and as input by a user through the HMI 309).

During flight, the controller regulates the sending 512 of multi-axis sonar pings from sonar letters on each of the faces associated with individual movement and to particular axis; these pings produce the overlapping server lobes described in relation to FIGS. 1 to 3. The various detectors recover 514 echoes from objects and these echoes permit the controller to resolve 516 a 3-D spatial environment (but excludes objects considered to be mobile). The local is therefore able to assemble and store 518 a record of relative movement of the UAV.

During flight, it may be desirable to establish a hover mode and to undertake recalibration process of the various on-board sensors; this is shown by the optional except back to operational block 502.

Assuming that the fight continues, the controller assesses 520 whether there has been a loss of the control signal to which the UAV is generally responsive. In the affirmative 522, the UAV 10 may initiate an automatic retrace 524 of its stored route until such time as the control signal is required (as determined by the controller a decision block 526). Once the control signal is re-acquired, the UAV 10 may continue penetration and reporting (flow path through controller decision block 528 and a return to process flow step 512), or the controller 302 can receive an instruction to recover the UAV through a planned egress and exit strategy 530.

Returning to the potential loss of the control signal, if there is no loss of a control signal (path 532) then the controller may make a determination 534 as to whether there is a loss or discrepancy in GPS data. In the affirmative 536, the controller may ignore future GPS information or otherwise recalibrate the position of the UAB 10 based on recorded and absolute relative movement of the UAV. Again, the system can return to its principal control loop in which the controller regulates the sending of sonar pings to assemble a sonar envelope used for spatial mapping. Of course, if there is no loss of GPS data then the system will generally operates to continue penetration and reporting until such time as the system (and particularly the controller of the UAV) is told to cease operation and be recovered under controlled flights to the motor control centre 307.

It will be appreciated that the precise execution of the various functional steps exemplified in the flow diagram of FIG. 5 may be changed and re-ordered and are therefore merely illustrative of some of the more significant functional events undertaken by the preferred embodiments of the present invention.

It will be further understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions.

It will, of course, be appreciated that the above description has been given by way of example only and that modifications in details may be made within the scope of the present invention. For example, while a preferred embodiment describes the UAV as an aero drone, the principle of building a sonar bubble, a sonar-based sensor calibrating system and an egress mapping process through determination of a working environment (such as doors and furniture and relative clearances) in 3D space can be applied to other forms of remotely controlled vehicle, including reconnaissance cars. The term "UAV" should therefore be understood to relate to any form of powered, remote-controlled drone and not limited to aerial (micro or nano) vehicles.

It will be understood that reference to a controller is reference any suitable processor function, including application specific chips and, potentially, even an on-board server. Consequently, reference to a controller should be understood to include one or more processor chips that combine to support full control and reporting of the UAV and not otherwise limited to just a single device (although this is also envisaged if sufficient addressing and processing power is available within that single device).

What is claimed is:

1. A UAV containing a drive system for propelling the UAV through a spatial environment:
   a controller for controlling the drive system and overseeing operation of the UAV;
   a multiplicity of sonar emitters associated with different axes of travel of the UAV, each sonar emitter producing a sonar lobe extending outwardly in a specified direction along each of said different axes of travel, the sonar lobes combining to encapsulate the UAV in a sonar bubble; and
   a multiplicity of sonar detectors, each axis of travel associated with a plurality of sonar detectors, wherein the sonar detectors are coupled to the controller to permit the controller, in response to echoes reflected off objects within the sonar bubble, to interpret and then generate a 3-D image of the spatial environment in which the UAV is stationary or moving and within which spatial environment the objects are stationary or moving; and wherein
   the controller is configured or arranged automatically to moderate the drive system in response to an assessed position of objects in the 3-D image relative to the UAV such that the controller independently controls movement of the UAV through the spatial environment along each axes of travel.

2. The UAV recited in claim 1, wherein the sonar bubble is assembled from partially overlapping three-dimensional spatial sonar lobes generated by relatively inclined pairs of sonar emitters.

3. The UAV recited in claim 2, wherein at least two sonar detectors are associated with each direction long each axis of travel, and wherein the controller is configured or arranged to resolve detected variations at least one of signal strength and round trip timing for pings to and echoes from objects in the sonar bubble to assess a relative position and nature of those objects with respect to the UAV.

4. The UAV recited in claim 1, further comprising:
   motion and position sensors configured to measure absolute movements of the UAV in 3-D space; and
   a memory for storing the absolute movement of the UAV in the spatial environment as resolved by the controller having regard to the measure of absolute movements and the 3-D image constructed from object data acquired from use of the sonar bubble.

5. The UAV recited in claim 1, wherein object data acquired from use of the sonar bubble is used to compensate drift in at least one of the motion and position sensors.

6. The UAV recited in claim 4, wherein object data acquired from use of the sonar bubble is used to compensate drift in at least one of the motion and position sensors.

7. The UAV recited in claim 4, wherein object data determined as being within a predetermined minimum distance of the UAV is excluded from said generated 3-D image of the spatial environment.

8. A method of controlling movement of a UAV through 3-D space, the method comprising:
   Generating a sonar bubble that substantially encapsulates the UAV, the sonar bubble assembled from overlapping beamformed sonar lobes produced from sonar pings emanating from a multiplicity of sonar emitters on the UAV, the sonar emitters associated with directions of movement of the UAV through the 3-D space;
   in response to echoes reflected off objects within the sonar bubble following production of said beamformed sonar lobes and as detected by a multiplicity of sonar detectors on the UAV, having a controller in the UAV interpret and then generate a 3-D image of the spatial environment in which the UAV is stationary or moving and within which spatial environment the objects are classified as stationary or moving; and
   having the controller independently and automatically control movement of the UAV through the spatial environment by applying direct control to a drive system tasked with effecting movement in each axis of travel.

9. The method of controlling movement of a UAV recited in claim 8, the method further comprising:
   measuring absolute movements of the UAV in 3-D space using motion and position sensors;
   storing in memory the absolute movement of the UAV in the spatial environment as resolved by the controller having regard to the measure of absolute movements and the 3-D image constructed from object data acquired from use of the sonar bubble; and
   under automatic instruction from the controller and with reference to the memory, automatically re-tracing the movement of the UAV upon loss of an external control signal or upon receipt of an instruction received over a wireless link.

10. The method of controlling movement of a UAV recited in claim 8, further comprising:
    establishing a hover mode in the UAV; and
    based on distance measurement data to objects acquired from use of the sonar bubble, compensating for drift in at least one motion or position sensor in the UAV.

* * * * *